UNITED STATES PATENT OFFICE.

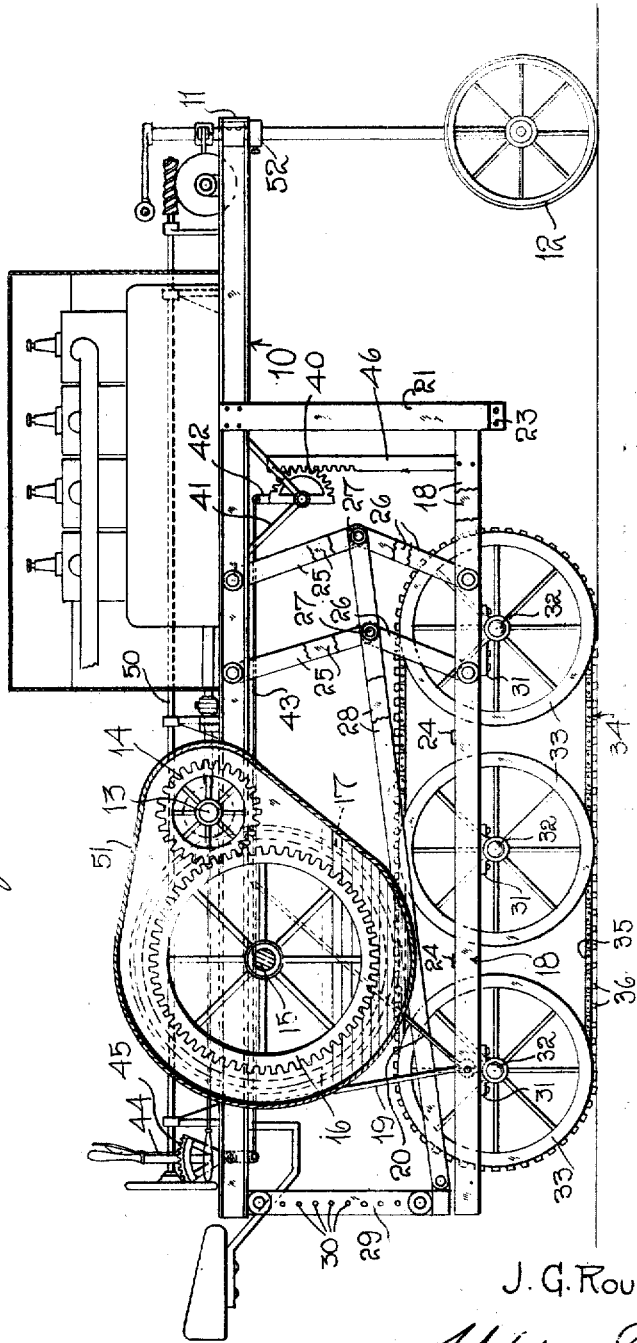

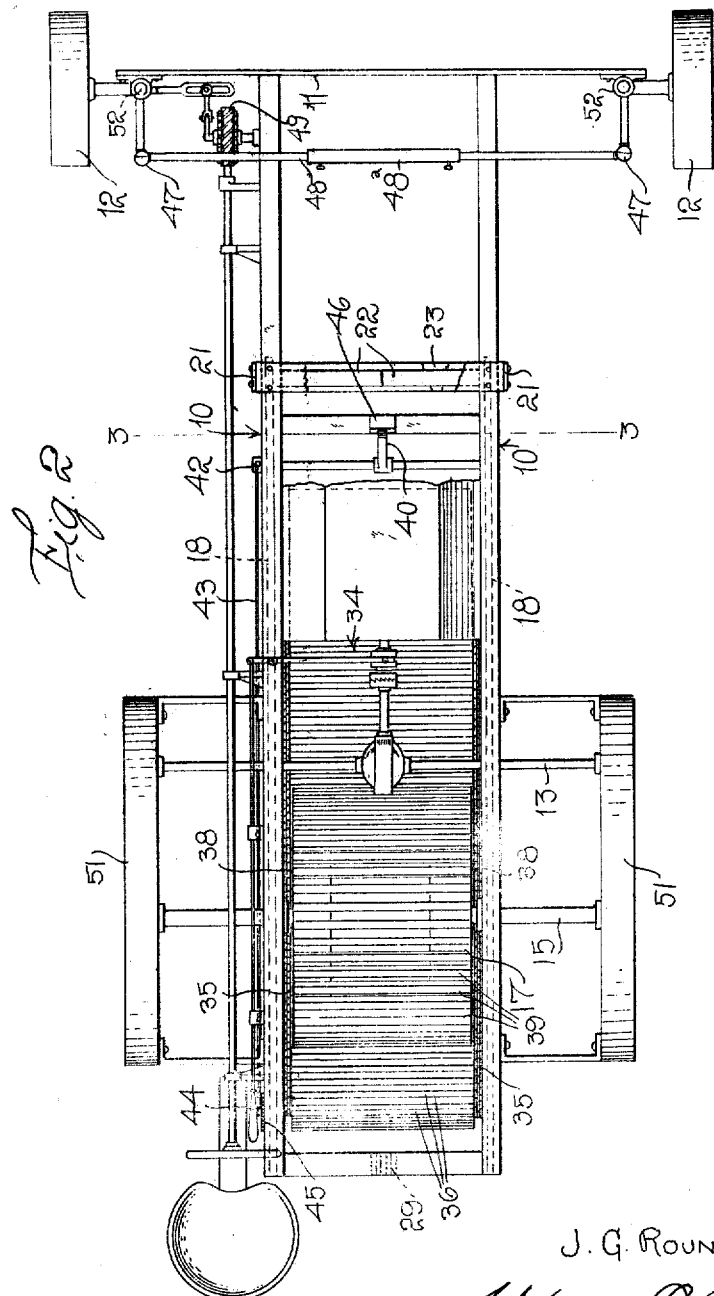

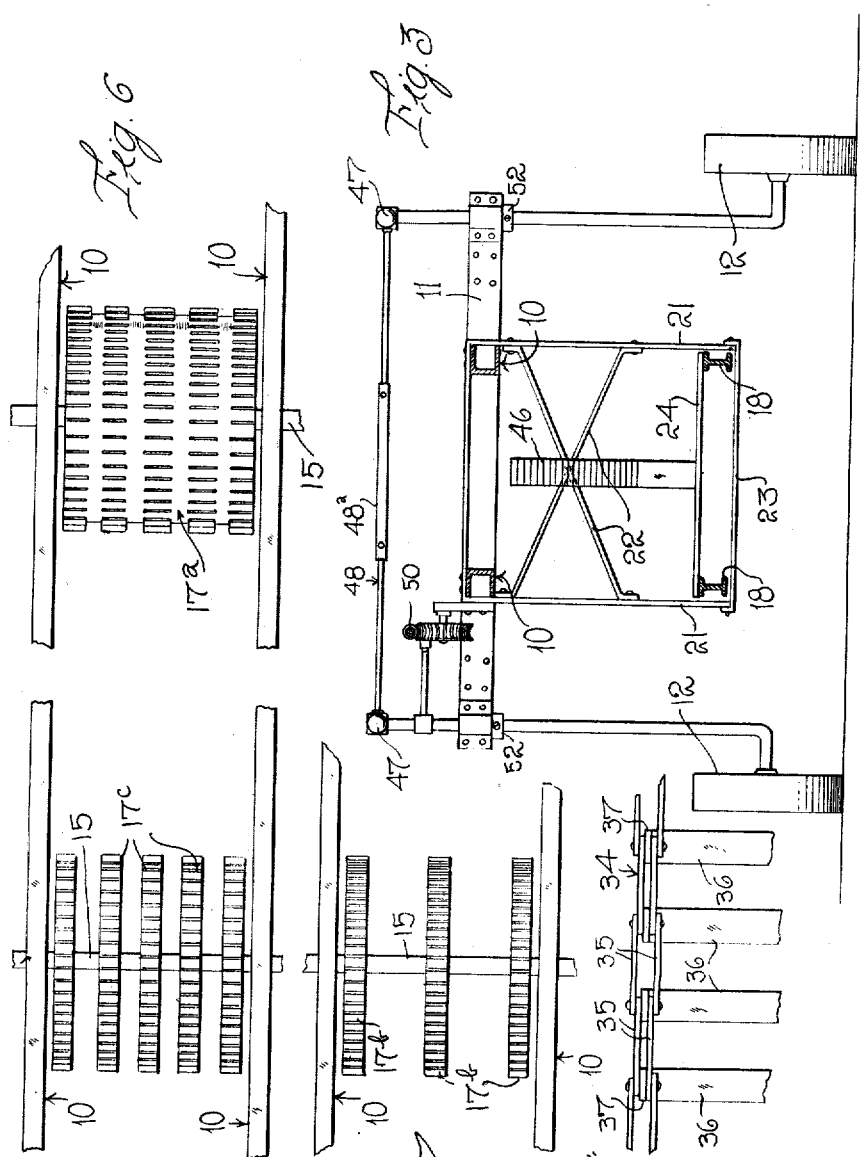

JOSEPH G. ROUNTREE, OF BEEVILLE, TEXAS.

CATERPILLAR-TRACTOR.

1,265,118.

Specification of Letters Patent.

Patented May 7, 1918.

Application filed August 11, 1917. Serial No. 185,761.

*To all whom it may concern:*

Be it known that JOSEPH G. ROUNTREE, a citizen of the United States, residing at Beeville, in the county of Bee and State of Texas, has invented certain new and useful Improvements in Caterpillar-Tractors, of which the following is a specification, reference being had to the accompanying drawings.

This invention relates to tractors, such as are used for farm work, and particularly to tractors of the "caterpillar" type, wherein an endless element having tractive treads engages the ground and moves the machine forward.

A general object of my invention is to provide a tractor of this type in which the endless element is driven by a driving member which is not disposed between the upper and lower flights of the endless element but is disposed above the endless element and engages therewith, thus lifting the driving means out of a position where it will become clogged with mud and dust.

Still another object is to provide means whereby the endless driving element, with its supporting wheels, will be forced to engage the ground or road with a force proportionate to the load which the tractor is pulling, so that if there is a relatively light load, the tractive force will be less than when there is a relatively heavy load.

Still another object is to provide manually operable means for decreasing or increasing the engagement of the tractive element with the ground;

And a further object is to improve the details of construction of machines of this type and to provide means whereby the forward portion of the endless element with its supporting wheels may be raised so as to permit the tractor to be turned in a relatively short radius which is not possible with the caterpillar tractors as at present constructed.

Other objects will appear in the course of the following description.

My invention is illustrated in the accompanying drawings, wherein:—

Figure 1 is a side elevation of a tractor constructed in accordance with my invention, the housing 51 being in section;

Fig. 2 is a top plan view of the construction illustrated in Fig. 1;

Fig. 3 is a section on the line 3—3 of Fig. 2;

Fig. 4 is a fragmentary plan view of the endless element;

Figs. 5, 6 and 7 are fragmentary top plan views of various forms of driving drum for the endless element.

Referring to the drawings it will be seen that the main frame of the tractor comprises the longitudinally extending beams 10, which are spaced from each other any desired distance and which support the motor, which is of any usual or suitable type. Inasmuch as the motor forms no part of my invention and as any suitable motor may be used, I have not described the motor and its attachments or connections. The beams 10 are connected at their forward ends by a transverse cross bar 11, upon which are mounted the steering wheels in a manner to be later described. These steering wheels are designated 12. The beams 10 may be braced from each other in any suitable manner, and mounted upon the beams 10 in any suitable manner is a shaft 13 carrying the gear wheels 14, this shaft 13 being operatively connected to the engine to be driven thereby. Also mounted upon the frame formed by the beams 10 is a shaft 15, which carries the relatively large gear wheels 16, meshing with the gear wheels 14 and driven thereby. The shafts 13 and 15 both extend laterally beyond the beams 10. Also mounted upon the shaft 15 is the driving drum 17, as it may be termed, which generally speaking has a plurality of transversely extending slats, lugs or bars which mesh with the "crawler" as will be later stated.

Disposed below the frame formed by the beams 10 are the beams 18. These beams extend from the rear end of the frame forward to a point in advance of the gear wheels 14 and 16. The rear ends of the beams 18 are pivotally mounted upon braces 19 and 20, which are downwardly convergent and which are attached at their upper ends to the beams 10. Thus the forward ends of the beams 18 may be raised or lowered. Depending from the beams 10 are the lateral braces or hangers 21, which are braced from each other by the cross braces 22 and which at their bottom carry the transverse cross bar 23, which is disposed beneath the beams 18. The beams 18 may be connected at a plurality of points by cross braces 24. It will be understood that the beams 18 are vertically movable between the depending hangers 21.

Pivotally connected to the beams 10 are a plurality of toggle links 25, which extend downward and forward and pivotally connected to the beams 18 are a like number of toggle links 26. These links 25 and 26 are pivotally connected to each other at 27 and connected to the pivots of these links are the rearwardly extending draw bars 28, these draw bars preferably extending rearward and downward slightly and pivotally connected to these draw bars are the upwardly extending bars 29, pivoted at their upper ends to the beams 10, pivoted at their lower ends to the draw bars 28 and provided with a plurality of perforations 30 whereby various hitches may be made between the implement being pulled and the tractor.

It will be noted that the pull on these bars 29 will cause the draw bars 28 to be drawn rearward and thus cause the toggle links 25 and 26 to force the forward ends of the beams downward.

Mounted upon the under faces of the beams 18 are a plurality of bearings 31, the front bearings being adjustable along the beams 18 in any suitable manner, so as to tighten up the "crawler" chain or endless element. Mounted in the bearings 31 are a plurality of shafts 32, each of which carries a roller or like element 33, these rollers or like elements being flanged at their peripheries. Disposed over these rollers, wheels or equivalent support is the endless tractive element 34. This, as illustrated in Fig. 4 comprises a plurality of links 35 having pivotal engagement with each other, there being an outer set of links and an inner set of links and extending from one pair of links over to the other pair of links are the cross bars 36 having upturned ends 37, which are riveted between the links and having pivotal engagement therewith. I do not wish to be limited, however, to this particular method of constructing the endless tractive element or "crawler" chain.

The driving drum 17 may be of many different forms. For instance, as illustrated in Fig. 2, it may comprise annuli 38 connected by transverse cross bars 39, the cross bars being spaced from each other so as to mesh with the bars 36 of the crawler chain, or, as illustrated in Fig. 5, there may be a plurality of annuli 17ᶜ mounted upon the shaft, each annulus being provided with outwardly projecting teeth, or as shown in Fig. 6, this member may consist of a solid drum 17ᵃ mounted upon wheels at its ends and provided with teeth, or as in Fig. 7, a plurality of sprocket wheels 17ᵇ may be mounted upon the shaft 15. In all of these cases however the teeth on the annuli of the bars 39 in Fig. 2 mesh with the bars 36 so that a rotation of the drum will cause a progressive movement of the endless tractive element.

For the purpose of manually raising or lowering the crawler supporting frame formed by the bars 18 and the transverse braces, I may provide any suitable mechanism, but I have shown for this purpose a sector gear 40 rotatably mounted upon a support 41, this sector gear having an arm 42, in turn connected to a rod 43 which extends rearward to the rear end of the tractor and is connected to a lever 44 operating over the rack 45 engaged therewith in the usual manner. This sector gear 40 coacts with a vertically disposed rack bar 46, which in turn is connected at its lower end to the beams 18. It will, therefore, be seen that by operating the lever 44, the forward end of the crawler supporting frame may be raised or lowered and that by raising the forward end of the frame formed by the bars 18, the crawler, composed of the rollers 33 and the endless tractive element 34 will be raised so that only the rear end of the tractive element will engage the ground to thus permit the machine to turn in a relatively short radius, which it could not do if otherwise connected.

For the purpose of steering the machine, the wheels 12 are mounted upon knuckles 47 of any usual or suitable type, these knuckles being connected by a transverse connecting rod 48 in turn operated by means of a gear wheel and worm, the worm 49 being attached to the steering shaft 50 which extends to the rear end of the machine and is provided with the usual operating handle. Preferably the driving gear wheels 14 and 16 will be entirely inclosed in housings 51. Preferably the knuckles 47 are adjustably mounted on the cross beam 11 by means of set collars 52, engaging with transversely shiftable bearings 52ᵃ. The rod 48 is preferably formed in three sections, the outer sections of the rod being adjustably mounted in a middle tubular section 48ᵃ.

The operation of this mechanism will be plain from what has gone before. Under ordinary circumstances the whole length of the tractor chain or endless element lies flat against the surface of the ground and propels the tractor. If desired, however, the forward portion of the endless element may be raised so that only a portion of it engages the ground. The pull on the draw bars 28 forces the forward portion of the tractor down so as to thus increase the tractive power proportionately to the load being drawn and the greater the load and resistance, the greater the tractive power. The use of toggle links provides for a very great force being exerted upon the tractor chain to force it downward. Inasmuch as the rear roller supporting the tractor chain is fixed in its relation to the driving wheel or drum, it is obvious that the driving drum will always engage the upper flight of the crawler chain so as to cause a proper movement of the crawler chain. A tractor constructed in accordance with this invention is extremely effective and it is obvious that it has a wide range of use. It is also obvious, of course, that gearing may be provided whereby the speed of the tractor may be increased or decreased in the usual manner. I have not illustrated this gearing as such gearing is obvious. It will also be seen that while I have illustrated a particular embodiment of my invention, yet the principle of the invention may be embodied in a large variety of forms of tractors.

Having described my invention, what I claim is:

1. A tractor including a supporting frame, a power driven tractive element operatively supported upon the frame for movement in a vertical plane, a draw bar adapted to be connected to an object being drawn by the tractor, and toggle links pivoted to each other and to the main frame and operatively pivoted to the tractive element, said toggle links acting when the draw bar is relatively shifted rearward to move the tractive element downward in a vertical plane.

2. A tractor including a main supporting frame, an auxiliary frame disposed below the main frame, said auxiliary frame being pivotally supported at its rear end, an endless tractive element operatively mounted upon the auxiliary frame, a pair of toggle links pivoted to the main frame and to the auxiliary frame, and a draw bar connected to said toggle links and extending rearward therefrom, the toggle links being arranged to cause a depression of the forward end of the auxiliary frame when the draw bar is relatively retracted.

3. A tractor including a main frame, an auxiliary frame mounted upon the main frame for vertical movement, an endless tractive element mounted upon the auxiliary frame, a member operatively pivoted to the bars of the main frame and movable in a vertical plane, said element being operatively connected to the auxiliary frame, and a draw bar connected to said member and extending rearward therefrom to move said member downward in proportion to the draft on the draw bar to thereby shift the auxiliary frame and tractor downward in proportion to said draft.

4. A tractor comprising a main supporting frame, an endless tractive element operatively supported upon said frame and including transverse bars spaced from each other, a driving member mounted upon the main frame and having transversely extending members engaging between said bars on the upper flight of the tractive element, and means for driving said member.

5. A tractor including a supporting frame, an auxiliary frame mounted below the supporting frame, an endless tractive element operatively mounted upon the auxiliary frame and having spaced transversely extending bars, a driving wheel mounted upon the main frame and having lugs engaging between the bars of the tractive element, and means for driving said driving wheel.

6. A tractor comprising a main frame having steering wheels at its forward end, an auxiliary frame mounted below the rear end of the main frame, a plurality of rollers mounted upon the auxiliary frame, an endless tractive element passing over said rollers and having transversely spaced bars, a circular driving member mounted upon the main frame and having transversely extending lugs engaging between the bars of the endless driving element and upon the upper flight thereof, a motor on the main frame, and means for transmitting the power of the motor to said driving member.

7. A tractor comprising a main frame having steering wheels at its forward end, an auxiliary frame disposed below the rear end of the main frame and pivotally supported at its rear end, the forward portion of the auxiliary frame having vertical movement, a plurality of rollers mounted upon the auxiliary frame in horizontal alinement, a tractive element passing around said rollers and having transversely extending ground engaging bars spaced from each other, a drum mounted upon the main frame and having transversely extending members engaging between said bars on the upper flight of the tractive element, motor operated means for driving said drum, a U-shaped yoke mounted upon the main frame depending therefrom and receiving the forward end of the auxiliary frame, and means for vertically shifting the forward end of the auxiliary frame.

8. A tractor comprising a main frame having steering wheels at its forward end, an auxiliary frame disposed below the rear end of the main frame and pivotally supported at its rear end, the forward portion of the auxiliary frame having vertical movement, a plurality of rollers mounted upon the auxiliary frame in horizontal alinement, a tractive element passing around said rollers and having transversely extending ground engaging bars spaced from each other, a drum mounted upon the main frame and having transversely extending members engaging between said bars on the upper flight of the tractive element, motor operated means for driving said drum, a U- shaped yoke mounted upon the main frame depending therefrom and receiving the forward end of the auxiliary frame, means for vertically shifting the forward end of the auxiliary frame, said means including a manually operable lever operatively connected to the forward end of the auxiliary frame to raise or lower it, and a draft connection operatively connected to the forward end of the auxiliary frame to raise or lower it in proportion to the draft on the tractor.

9. A tractor including a main frame having steering wheels at its forward end, a motor mounted on the main frame, an auxiliary frame pivotally supported at its rear end and disposed below the main frame and comprising spaced parallel beams, a plurality of rollers mounted upon the auxiliary frame, an endless transversely slatted element mounted upon said rollers and constituting a driver, bars extending down from the main frame and connected at their lower ends by a cross bar and receiving between them the lower end of an auxiliary frame, toggle links pivoted to each other and pivotally connected to the main frame and the auxiliary frame at the forward end of the latter, a draft bar connected to the adjacent pivoted ends of the toggle links and extending rearward therefrom, a horizontal rod connected to said draft bar and having perforations providing for a plurality of hitches, means on the main frame for driving the endless element, and manually operable means for raising or lowering the forward end of the auxiliary frame.

10. A tractor including a main frame having steering wheels at its forward end, a motor mounted on the main frame, an auxiliary frame pivotally supported at its rear end and disposed below the main frame and comprising spaced parallel beams, a plurality of rollers mounted upon the auxiliary frame, an endless transversely slatted element mounted upon said rollers and constituting a driver, bars extending down from the main frame and connected at their lower ends by a cross bar and receiving between them the lower end of an auxiliary frame, toggle links pivoted to each other and pivotally connected to the main frame and the auxiliary frame at the forward end of the latter, a draft bar connected to the adjacent pivoted ends of the toggle links and extending rearward therefrom, a horizontal rod connected to said draft bar and having perforations providing for a plurality of hitches, means on the main frame for driving the endless element, manually operable means for raising or lowering the forward end of the auxiliary frame, said means including a vertically disposed rack on the auxiliary frame at its forward end, a sector gear engaging the rack, a lever pivoted on the main frame, and a connection between the sector gear and said lever.

11. A tractor comprising a main supporting frame, a tractive element operatively supported upon said frame and including transverse bars spaced from each other, a driving member mounted upon the supporting frame and having transversely extending members engaging between said bars, and means for driving said driving member.

In testimony whereof I hereunto affix my signature in the presence of two witnesses.

JOSEPH G. ROUNTREE.

Witnesses:
J. B. BARRY,
M. A. MILLER.